(12) United States Patent
Hiraki et al.

(10) Patent No.: US 10,173,180 B2
(45) Date of Patent: Jan. 8, 2019

(54) METHOD OF PRODUCING COMPOSITE, AND COMPOSITE

(71) Applicant: FUJIFILM Corporation, Tokyo (JP)

(72) Inventors: Daisuke Hiraki, Ashigara-kami-gun (JP); Yoshihiro Aburaya, Ashigara-kami-gun (JP); Makoto Sawada, Ashigara-kami-gun (JP); Satoshi Yoneyama, Ashigara-kami-gun (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 132 days.

(21) Appl. No.: 15/145,889

(22) Filed: May 4, 2016

(65) Prior Publication Data

US 2016/0243507 A1    Aug. 25, 2016

Related U.S. Application Data

(63) Continuation of application No. PCT/JP2014/083911, filed on Dec. 22, 2014.

(30) Foreign Application Priority Data

Dec. 27, 2013    (JP) .................................. 2013-273323

(51) Int. Cl.
*B01D 71/70*    (2006.01)
*B01D 69/12*    (2006.01)
(Continued)

(52) U.S. Cl.
CPC ........... *B01D 71/70* (2013.01); *B01D 53/228* (2013.01); *B01D 67/0088* (2013.01);
(Continued)

(58) Field of Classification Search
CPC .. B01D 71/70; B01D 53/228; B01D 67/0088; B01D 69/12; B05D 3/0413
See application file for complete search history.

(56) References Cited

U.S. PATENT DOCUMENTS

2013/0287958 A1    10/2013    Oouchi

FOREIGN PATENT DOCUMENTS

EP    0 443 642 A2    8/1991
EP    0532199 A1 *    3/1993    ............. B01D 69/02
(Continued)

OTHER PUBLICATIONS

Translation of JP 2013-027806, Aburaya et al., Feb. 7, 2013, p. 1-33. (Year: 2013).*
(Continued)

*Primary Examiner* — Hai Vo
(74) *Attorney, Agent, or Firm* — Sughrue Mion, PLLC

(57) ABSTRACT

There is provided a method of producing a composite which is capable of suitably forming a silicone resin layer for preventing the facilitated transport film from entering the porous support in an acidic gas separation film formed by forming a facilitated transport film on a porous support, and the composite. The problem is solved by the method of producing a composite including hydrophilizing the surface of the porous support using a roll-to-roll system; and coating the hydrophilized surface of the porous support with a silicone coating solution that becomes the silicone resin layer using the roll-to-roll system.

3 Claims, 3 Drawing Sheets

(51) Int. Cl.
  *B01D 53/22* (2006.01)
  *B01D 67/00* (2006.01)
  *B05D 3/04* (2006.01)
  *B05D 3/06* (2006.01)

(52) U.S. Cl.
  CPC .......... *B01D 69/12* (2013.01); *B01D 2323/02* (2013.01); *B01D 2323/42* (2013.01); *B05D 3/0413* (2013.01); *B05D 3/067* (2013.01); *B05D 2201/02* (2013.01); *B05D 2201/04* (2013.01); *B05D 2252/02* (2013.01); *B05D 2518/10* (2013.01)

(56) References Cited

FOREIGN PATENT DOCUMENTS

| JP | 62-140620 A | 6/1987 |
|---|---|---|
| JP | 4-215824 A | 8/1992 |
| JP | 7-102310 B2 | 11/1995 |
| JP | 2001-293340 A | 10/2001 |
| JP | 2012-143711 A | 8/2012 |
| JP | 2013-27806 A | 2/2013 |

OTHER PUBLICATIONS

Translation of JP 2001-293340, Yoshimura et al., Oct. 23, 2001, p. 1-8. (Year: 2001).*
Translation of JP S62-140620, Sakuma et al., Jun. 24, 1987, p. 1-6. (Year: 1987).*
International Preliminary Report on Patentability issued by the International Bureau in counterpart International application No. PCT/JP2014/083911, dated Jul. 7, 2016.
International Search Report for PCT/JP2014/083911 dated Mar. 17, 2015.
Communication dated Sep. 20, 2016 from the Japanese Patent Office in counterpart application No. 2013-273323.

* cited by examiner

METHOD OF PRODUCING COMPOSITE, AND COMPOSITE

CROSS-REFERENCE TO RELATED APPLICATIONS

This application is a Continuation of PCT International Application No. PCT/JP2014/083911 filed on Dec. 22, 2014, which claims priority under 35 U.S.C. § 119(a) to Japanese Patent Application No. 2013-273323 filed on Dec. 27, 2013. The above application is hereby expressly incorporated by reference, in its entirety, into the present application.

BACKGROUND OF THE INVENTION

1. Field of the Invention

The present invention relates to a method of producing a composite used for an acidic gas separation film that selectively separates acidic gas from raw material gas, and a composite produced according to the production method. More specifically, the present invention relates to a method of producing a composite capable of suitably forming a silicone resin layer for preventing a facilitated transport film from entering a porous support on the surface of the porous support, and a composite.

2. Description of the Related Art

In recent years, a technique of selectively separating acidic gas such as carbon dioxide from raw material gas (gas to be treated) has been developed. For example, an acidic gas separation module that separates acidic gas from raw material gas using an acidic gas separation film through which acidic gas selectively permeates has been developed.

For example, JP1992-215824A (JP-H04-215824A) discloses an acidic gas separation module obtained by winding a laminate containing an acidic gas separation film around a central tube (central permeating material collection tube), in a tube wall of which through-holes are formed and which is used for collecting separated acidic gas, multiple times.

A so-called dissolution diffusion film is used for the acidic-gas separation module disclosed in JP1992-215824A (JP-H04-215824A) as an acidic gas separation film. The dissolution diffusion film separates acidic gas from raw material gas using differences in solubilities of acidic gas and materials to be separated therefrom in a film and differences in diffusibility in a film.

JP1995-102310B (JP-H07-102310B) discloses an acidic gas separation film formed with a hydrogel film that is formed by allowing a vinyl alcohol-acrylate copolymer having a cross-linked structure to absorb an aqueous solution including a carbon dioxide carrier on a carbon dioxide-permeating support, as an acidic gas separation film (carbon dioxide separation gel film) that separates carbon dioxide from raw material gas.

This acidic gas separation film is an acidic gas separation film using a so-called facilitated transport film. The facilitated transport film has a carrier reacting with acidic gas, such as a carbon dioxide carrier, therein and separates acidic gas from raw material gas by transporting the acidic gas to the opposite side of the film using the carrier.

Such an acidic gas separation film typically has a configuration in which the above-described dissolution diffusion film or facilitated transport film (hereinafter, both films are collectively referred to as a separation film) is formed on the surface of a support (porous support) having gas permeability, for example, non-woven fabric or a porous film.

Hereinafter, the dissolution diffusion film and the facilitated transport film are also collectively referred to as a "separation layer."

For this reason, when the acidic gas separation film is used, the separation layer gradually enters (infiltrates into) the porous support in some cases. Particularly, the facilitated transport film is frequently a gel film or a film having low viscosity in order to move or transport acidic gas. Accordingly, when the acidic gas separation film using the facilitated transport film is used, the separation layer gradually enters the porous support.

In the acidic gas separation film, the performance of separating out acidic gas is degraded with time due to the separation layer entering the porous support.

Further, in order for the carrier to fully function, the facilitated transport film needs to hold a large amount of water therein. For this reason, a polymer with excellent water-absorbing properties and water-holding properties is used for the facilitated transport film. In addition, the amount of water able to be absorbed of the facilitated transport film is increased and the performance of separating out acidic gas is improved when the content of the carrier such as metal carbonate is large. That is, the facilitated transport film is frequently a gel film which is extremely soft (low viscosity).

Moreover, in the acidic gas separation film using the facilitated transport film, raw material gas under the conditions of a temperature of 100° C. to 130° C. at a humidity of approximately 90% is supplied at a pressure of approximately 1.5 MPa at the time of separating out acidic gas.

Therefore, in the acidic gas separation film using the facilitated transport film, the facilitated transport film tends to enter the porous support and the durability is low.

Further, JP1987-140620A (JP-S62-140620A) discloses a method of producing an acidic gas separation film (method of producing a thin film) which includes coating a surface of a porous support with a solution including a polymer as a main component; forming a base layer formed of a polymer having air conductivity such as a silicone-based polymer; coating the base layer with an organic solvent solution including a material which becomes a separation layer as a main component; and drying the base layer to form the separation layer.

When the acidic gas separation film according to this production method has the base layer formed of a polymer having air conductivity, it is possible to form a uniform separation layer and to prevent the separation layer with low viscosity from entering the porous support.

SUMMARY OF THE INVENTION

As disclosed in JP1987-140620A (JP-S62-140620A), when a non-porous base layer having air conductivity such as a silicone-based polymer is formed on the surface of the porous support and a separation layer is formed thereon, it is possible to prevent the separation layer from entering the porous support.

However, such a base layer is typically formed by coating the surface of the porous support with a coating solution containing a component which becomes the base layer and drying and curing the surface.

Consequently, the coating solution infiltrates into the porous support while the porous support is coated with the coating solution which becomes the base layer. Due to the coating solution infiltrating into the porous support, there is a problem in that an appropriate base layer is unlikely to be formed on the surface of the porous support.

The present invention has been made in consideration of the above-described problems of the related art, and an object thereof is to provide a method of producing a composite which is used for an acidic gas separation film having a facilitated transport film and has a silicone resin layer used to prevent the facilitated transport film from entering a porous support, that is, a method of producing a composite which prevents a silicone coating solution that becomes a silicone resin layer from infiltrating into a porous support and is capable of suitably forming a dense silicone resin layer on the surface of the porous support; and the composite produced by this production method.

According to an aspect of the present invention, in order to achieve the above-described object, there is provided a method of producing a composite formed by forming a silicone resin layer on a surface of a porous support and having a surface on which a facilitated transport film is formed in an acidic gas separation film having the facilitated transport film, the method comprising: hydrophilizing at least one surface of the porous support using a roll-to-roll system; and coating the hydrophilized surface of the porous support with a silicone coating solution that becomes the silicone resin layer using the roll-to-roll system.

In the method of producing a composite according to the present invention, it is preferable that the method further comprises coating the surface of the silicone resin layer or the surface of the porous support with a coating composition that becomes the facilitated transport film, which contains a carrier at least reacting with acidic gas and a hydrophilic compound for carrying the carrier using the roll-to-roll system.

Further, it is preferable that the surface of the silicone resin layer is coated with the coating composition.

Further, it is preferable that the hydrophilicity of the surface of the porous support is in a range of 1% to 99%.

Further, it is preferable that the surface of the porous support is hydrophilized when a hydrophilic polymer layer is formed. At this time, it is preferable that the hydrophilicity of the surface of the porous support is in a range of 20% to 90%.

Further, it is preferable that the silicone resin layer having a film thickness of 10 μm or less is formed.

Further, it is preferable that the contact angle with water with respect to the hydrophilized porous support in air is in a range of 0° to 90°.

According to another aspect of the present invention, there is provided a composite comprising: a porous support of which at least one surface is hydrophilic; a silicone resin layer which is formed on one surface that is the hydrophilic surface of the porous support; and a facilitated transport film which is formed on the surface of the porous support or the surface of the silicone resin layer and contains a carrier at least reacting with acidic gas and a hydrophilic compound for carrying the carrier.

In the composite according to the present invention, it is preferable that the facilitated transport film is formed on the silicone resin layer.

Further, it is preferable that the porous support has a hydrophilic polymer layer on at least one surface.

According to the present invention, in the acidic gas separation film using the facilitated transport film, it is possible to suitably form a silicone resin layer for preventing the facilitated transport film from entering the porous support on the surface of the porous support.

For this reason, according to the present invention, it is possible to obtain an acidic gas separation film which prevents the facilitated transport film from entering (infiltrating into) the porous support and has excellent durability.

DESCRIPTION OF THE PREFERRED EMBODIMENTS

Hereinafter, a method of producing a composite of the present invention and the composite will be described in detail with reference to preferred examples illustrated in the accompanying drawings.

Figure 1A:
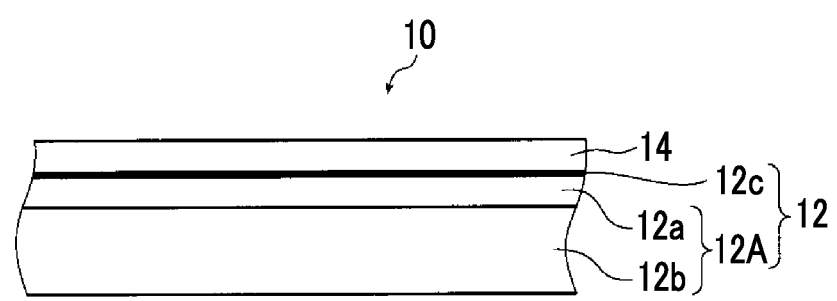
FIG. 1A is a view schematically illustrating an example of a composite produced by a method of producing a composite of the present invention and FIG. 1B is a view schematically illustrating an example of a composite of the present invention produced by the method of producing a composite of the present invention.

FIG. 1A schematically illustrates an example of the composite produced by the method of producing a composite of the present invention.

A composite 10 is a composite used for an acidic gas separation film having a facilitated transport film and is formed by forming a silicone resin layer 14 on the surface of a porous support 12.

As described above, there is a problem in that the durability of the acidic gas separation film using the facilitated transport film is poor due to the facilitated transport film which is a soft gel film entering (infiltrating into) the porous support 12. However, when the silicone resin layer 14 is present on the surface of the porous support 12 and the facilitated transport film (acidic gas separation layer) is formed on the surface of the silicone resin layer 14, it is possible to prevent the facilitated transport film from entering the porous support 12.

Although described in detail later, as a preferred embodiment, the porous support 12 has a porous film 12a and an auxiliary support film 12b and has a configuration in which a hydrophilic polymer layer 12c used to make the surface of the porous support 12 hydrophilic is formed on the surface of the porous film 12a.

In the production method of the present invention, the long porous support 12 is used, the surface of the porous support 12 is hydrophilized according to a so-called roll-to-roll system (hereinafter, also referred to as a RtoR system), and then the surface of the porous support 12 is coated with a silicone coating solution which becomes the silicone resin layer 14 according to the RtoR system in the same manner. In the example illustrated in the figure, the hydrophilic polymer layer 12c is formed on the surface of the porous support 12 in order to hydrophilize the surface of the porous support 12.

As is well known, the RtoR system is a production method in which a object to be treated is drawn out from a roll formed by winding a long object to be treated while the object to be treated is conveyed in the longitudinal direction and subjected to a treatment such as coating or curing, and the treated object is wound in a roll shape.

Figure 2:
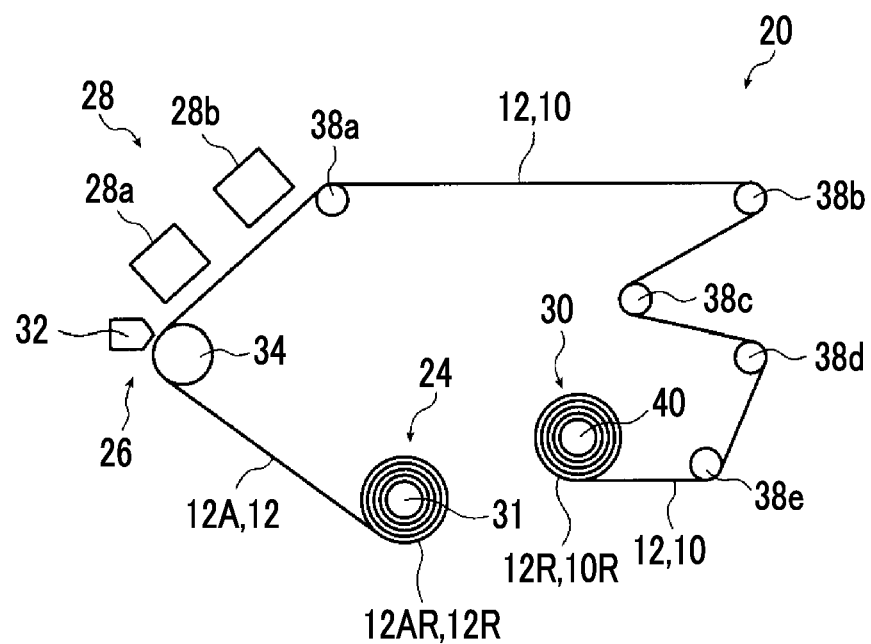
FIG. 2 is a view schematically illustrating an example of a production apparatus that performs the method of producing a composite according to the present invention.

FIG. 2 schematically illustrates an example of a production apparatus that performs the production method of the present invention.

As described above, the porous support 12 (hereinafter, also referred to as a support 12) includes the porous film 12a, the auxiliary support film 12b, and the hydrophilic polymer layer 12c. The production in the example of the figure forms the hydrophilic polymer layer 12c and the silicone resin layer 14. As described above, these layers are formed by the production apparatus using the RtoR system.

The production apparatus 20 illustrated in FIG. 2 is basically configured to include a supply unit 24, a coating unit 26, a curing unit 28, and a winding unit 30.

Moreover, other than the members illustrated in the figure, the production apparatus 20 may include various members provided for an apparatus that produces a functional film according to the RtoR system, such as a pass roller (guide roller), conveying roller pairs, a conveying guide, and various sensors as needed.

In the production method of the present invention, first, a base support roll 12AR obtained by winding a long base support 12A (web-like base support 12A) that is formed by forming the porous film 12a on the auxiliary support film 12b in a roll shape is loaded to the supply unit 24 of the production apparatus 20. Next, the base support 12A is fed from the base support roll 12AR, and the fed base support 12A is coated with a polymer coating solution which becomes the hydrophilic polymer layer 12c using the coating unit 26 while the base support 12A is conveyed in the longitudinal direction. Next, the polymer coating solution is dried and cured to form the hydrophilic polymer layer 12c using the curing unit 28, and the support 12 formed by hydrophilizing the surface of the base support is obtained. Moreover, the formed support 12 is wound in a roll shape using the winding unit 30 and a composite roll 10R is obtained.

Next, the composite roll 10R is removed from the winding unit 30 and loaded to the supply unit 24, and the support 12 is fed from the composite roll 10R at the same time, and then the surface of the support 12 is coated with the silicone coating solution which becomes the silicone resin layer 14 using the coating unit 26 while the support 12 is conveyed in the longitudinal direction. Subsequently, the silicone coating solution applied to the support 12 is cured to form the silicone resin layer 14 using the curing unit 28, and the composite 10 in which the silicone resin layer 14 is formed on the surface of the support 12 is obtained. Further, the prepared composite 10 is wound in a roll shape using the winding unit 30 and the composite roll 10R is obtained.

Moreover, in the example illustrated in FIG. 2, the hydrophilic polymer layer 12c and the silicone resin layer 14 are formed by the same production apparatus 20.

However, according to the production method of the present invention, the hydrophilic polymer layer 12c and the silicone resin layer 14 may be formed by production apparatuses different from each other to prepare the composite 10.

The supply unit 24 is a portion in which the base support roll 12AR or a support roll 12R is loaded to a rotary shaft 31, and the base support roll 12AR or the support roll 12R is rotated by rotating the rotary shaft 31 to feed the base support 12A or the support 12.

In the supply unit 24, such feeding and conveying of the support 12 may be performed according to a known method.

The coating unit 26 coats the surface of the base support 12A with a polymer coating solution which becomes the hydrophilic polymer layer 12c or with a silicone coating solution which becomes the silicone resin layer 14.

In the example of the figure, the coating unit 26 includes a coating device 32 and a backup roller 34.

The base support 12A or the support 12 is conveyed in the longitudinal direction while being positioned in a predetermined coating position by the backup roller 34, and the surface thereof is coated with the polymer coating solution or the silicone coating solution by the coating device 32, thereby forming a coating film (liquid film) of the coating solution.

Further, in the coating unit 26, the temperature of the polymer coating solution or the silicone coating solution and the base support 12A or the support 12 may be controlled as needed.

As the coating device 32, various known devices can be used in accordance with the polymer coating solution or the silicone coating solution.

Specific examples thereof include a roll coater, a direct gravure coater, an offset gravure coater, a one-roll kiss coater, a three reverse roll coater, a positive rotation roll coater, a curtain flow coater, an extrusion die coater, an air doctor coater, a blade coater, a rod coater, a knife coater, a squeeze coater, a reverse roll coater, and a bar coater.

In addition, since different coating method are performed using the polymer coating solution and the silicone coating solution, the coating device 32 can be exchanged with another device.

The curing unit 28 dries and cures the polymer coating solution applied to the base support 12A to obtain the hydrophilic polymer layer 12c or dries or cures the silicone coating solution applied to the support 12 to obtain the silicone resin layer 14.

The curing unit 28 includes a drying device 28a and a curing device 28b.

While the base support 12A or the support 12 coated with the coating solution is conveyed in the longitudinal direction, the coating solution is dried by the drying device 28a. Next, the polymer or the silicone is cured by the curing device 28b.

As the drying device 28a, various known devices can be used in accordance with the composition of the polymer coating solution or the silicone coating solution. Specifically, hot-air drying, heat drying using a heating roller or a heater, or drying using a combination of plural kinds of these is exemplified.

As the curing device 28b, various known devices can be used in accordance with the hydrophilic polymer layer 12c or the silicone resin layer 14 to be formed. Specifically, irradiation with ultraviolet rays, irradiation with electron beams, heating, or humidification is exemplified.

Further, since different drying methods or curing methods are performed using the polymer coating solution and the silicone coating solution, the drying device 28a and/or the curing device 28b can be exchanged with another device.

The support 12 in which the polymer coating solution is cured by the curing unit 28 to form the hydrophilic polymer layer 12c or the composite 10 in which the silicone coating solution is cured by the curing unit 28 to form the silicone resin layer 14 is guided by pass rollers 38a, 38b, 38c, and 38d and conveyed to the winding unit 30.

The pass rollers 38b, 38c, and 38d act as a tension cutter and guide the support 12 and the composite 10 such that the support and the composite meander.

The support roll 12R is obtained by winding the support 12 or the composite roll 10R is obtained by winding the composite 10 using the winding unit 30, and the winding unit includes a pass roller 38e and a winding shaft 40.

The support 12 or the composite 10 conveyed to the winding unit 30 is guided to the winding shaft 40 by the pass roller 38e and is wound around the winding shaft 40, thereby obtaining the support roll 12R or the composite roll 10R.

Hereinafter, the production method of the present invention will be described in detail by specifically describing the formation of the hydrophilic polymer layer 12c and the formation of the silicone resin layer 14 using the production apparatus 20.

When the composite 10 is formed by the production apparatus 20, the hydrophilic polymer layer 12c is formed on the surface of the base support 12A including the porous film 12a and the auxiliary support film 12b as described above, and the support 12 (porous support 12) formed by hydrophilizing the surface thereof is prepared.

In the production apparatus 20, when the hydrophilic polymer layer 12c is formed, first, the base support roll 12AR formed by winding the long base support 12A in a roll shape is loaded to the rotary shaft 31 of the supply unit 24.

In the supply unit 24, the base support 12A is fed from the base support roll 12AR and conveyed to the coating unit 26 by rotating the rotary shaft 31.

Figure 1B:
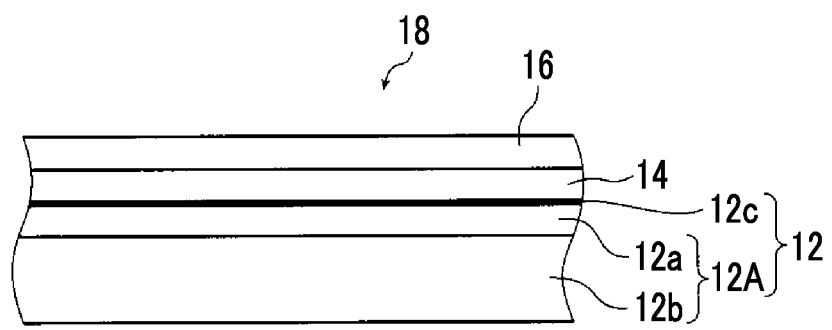

The base support 12A has permeability of acidic gas such as carbon dioxide and supports the silicone resin layer 14 formed on the surface of the support 12 and the facilitated transport film 16 formed on the surface of the silicone resin layer 14 or the surface of the support 12. The surface of the support 12 is on the opposite side of the surface on which the silicone resin layer 14 is formed. The facilitated transport film 16 will be described in detail later with reference to FIG. 1B.

As the support 12, various known supports can be used as long as the support can express a function of instructing the silicone resin layer 14 and the facilitated transport film 16.

In the production method of the present invention, the base support 12A may be formed of a single layer. However, it is preferable that the base support has a two-layer structure consisting of the porous film 12a and the auxiliary support film 12b similar to the base support 12A illustrated in FIGS. 1A and 1B. When the base support 12A has such a two-layer structure, the base support 12A reliably expresses the above-described acidic gas permeability and the function of supporting the silicone resin layer 14 and the facilitated transport film 16.

Moreover, in a case where the porous support is formed of a single layer, various materials exemplified in the porous film 12a and the auxiliary support film 12b described below can be used as the formation materials.

In the base support 12A having a two-layer structure, the porous film 12a becomes a surface on which the hydrophilic polymer layer 12c is formed. The surface on which the hydrophilic polymer layer 12c is formed is a hydrophilic surface. Accordingly, the surface on which the silicone resin layer 14 is formed, that is, the surface coated with the silicone coating solution becomes a surface on which the hydrophilic polymer layer 12c of the base support 12A is formed.

In addition, the facilitated transport film is typically formed on the surface of the silicone resin layer 14.

It is preferable that the porous film 12a has heat resistance and is formed of a material with low hydrolyzability. Specific examples of such a porous film 12a include a membrane filter film such as polysulfone (PSF), polyether sulfone, polypropylene (PP), or cellulose; an interfacial polymerization thin film such as polyamide or polyimide; and a stretched porous film such as polytetrafluoroethylene (PTFE) or high molecular weight polyethylene.

Among these, preferably, the porous film 12a including one or more materials selected from a fluorine-containing polymer such as PTFE, PP, and PSF is exemplified. Among these, from the viewpoints of high porosity, small diffusion inhibition of acidic gas (particularly carbon dioxide), strength, and production suitability, a stretched porous film such as PTFE or high molecular weight polyethylene is preferable. Particularly, from the viewpoints of heat resistance and low hydrolyzability, a stretched porous film such as PTFE is desirably used.

The auxiliary support film 12b is provided for reinforcement of the porous film 12a.

Various materials can be used as the auxiliary support film 12b as long as strength, stretch resistance, and gas permeability required for the film are satisfied. For example, non-woven fabric, woven fabric, a net, or mesh can be appropriately selected and then used.

It is preferable that the auxiliary support film 12b has heat resistance and is formed of a material with low hydrolyzability similar to the porous film 12a.

In consideration of this point, as the fibers constituting the non-woven fabric, woven fabric, or knitted fabric, fibers which are excellent in durability and heat resistance and formed of polyolefin such as polypropylene (PP); reforming polyamide such as ARAMID (trade name); a fluorine-containing resin such as polytetrafluoroethylene or polyvinylidene fluoride, and the like are preferable. It is preferable that the same material as described above is used for a resin material constituting mesh. Among these materials, non-woven fabric formed of PP which is inexpensive and has high mechanical strength is particularly preferably exemplified.

When the base support 12A has the auxiliary support film 12b, the mechanical strength can be improved. For this reason, even in a case of the production method of the present invention using the RtoR system, it is possible to prevent generation of wrinkles on the base support 12A and to improve the productivity.

When the base support 12A is extremely thin, the strength becomes weaker. In consideration of this point, it is preferable that the film thickness of the porous film 12a is in a range of 5 μm to 100 μm and the film thickness of the auxiliary support film 12b is in a range of 50 μm to 300 μm.

In addition, in a case where the base support 12A is formed of a single layer, it is preferable that the thickness of the base support 12A is in a range of 30 μm to 500 μm.

The hydrophilic polymer layer 12c is formed, and the maximum pore size of the porous film 12a that substantially supports the silicone resin layer 14 is preferably 5 μm or less, more preferably 1 μm or less, and particularly preferably 0.3 μm or less. In addition, the maximum pore size of the porous film 12a may be measured using, for example, a PERM-POROMETER.

The average pore size of the porous film 12a is preferably in a range of 0.001 μm to 1 μm and more preferably 0.001 μm to 0.3 μm.

When the maximum pore size or the average pore size of the porous film 12a is in the above-described range, it is possible to suitably prevent infiltration of the silicone resin layer 14, suitably prevent the porous film 12a from blocking the passage of acidic gas, and prevent the film surface thereof from being non-uniform due to the capillary phenomenon or the like when the film surface is coated with the silicone coating solution described below.

The base support 12A fed from the base support roll 12AR is subsequently conveyed to the coating unit 26.

In the coating unit 26, the base support 12A is conveyed in the longitudinal direction while being supported by the backup roller 34 in a predetermined position, and the entire surface of the porous film 12a is coated with the polymer coating solution which becomes the hydrophilic polymer layer 12c by the coating device 32.

From the viewpoint of the productivity, it is preferable that the conveying speed of the base support 12A is high. However, in order to uniformly coat the surface with the polymer coating solution, the conveying speed thereof is preferably in a range of 0.1 m/min to 200 m/min, more preferably in a range of 0.5 m/min to 150 in/min, and particularly preferably in a range of 1 m/min to 100 m/min.

The hydrophilic polymer layer 12c is formed to hydrophilize the surface of the support 12 (porous film 12a) coated with the silicone coating solution which becomes the silicone resin layer 14.

In other words, in the examples illustrated in FIGS. 1A to 2, when the hydrophilic polymer layer 12c is formed, the surface of the porous support is hydrophilized. In the examples of the figures, the surface of the porous support indicates the surface of the base support 12A.

In the production method of the present invention, when the surface of the support 12 is hydrophilized and the silicone resin layer 14 is formed on the hydrophilized surface, the dense (non-porous) silicone resin layer 14 can be suitably formed on the surface of the support 12, that is, the porous film 12a.

As described above, the acidic gas separation film having a facilitated transport film has a problem of durability because the soft gel-like facilitated transport film enters the porous support according to the use thereof. Meanwhile, as disclosed in JP1987-140620A (JP-S62-140620A), by forming a silicone resin layer on the surface of the porous support and forming a facilitated transport film on the surface of the silicone resin layer, it is possible to prevent the facilitated transport film from entering the porous support.

However, the silicone resin layer is typically formed by coating the porous support with a coating solution, which becomes a silicone resin and contains a monomer and the like, and curing the porous support. For this reason, the coating solution infiltrates into the porous support when the porous support is coated with the coating solution. Therefore, a suitable silicone resin layer cannot be formed on the surface of the porous support.

As a result, despite the formation of the silicone resin layer on the surface of the porous support, it is not possible to sufficiently prevent the facilitated transport film from entering the porous support and to improve the durability of the acidic gas separation film.

Meanwhile, in the production method of the present invention, the surface of the support 12 is hydrophilized by the RtoR system before the silicone resin layer 14 is formed. In the examples illustrated in the figures, the hydrophilic polymer layer 12c is formed on the surface of the porous film 12a of the base support 12A to hydrophilize the surface of the support 12.

Thereafter, the hydrophilized surface of the support 12 is coated with the silicone coating solution which becomes the silicone resin layer 14 according to the RtoR system, and the silicone resin layer 14 is formed.

As is well known, a silicone resin is hydrophobic. Therefore, even when the hydrophilized surface of the support 12 is coated with the silicone coating solution which becomes the silicone resin layer 14, the dense (non-porous) silicone resin layer 14 can be formed on the surface of the porous film 12a by preventing or suppressing the infiltration of the silicone coating solution into the porous film 12a. Therefore, when the facilitated transport film is formed on the surface of the silicone resin layer 14 using the composite 10 according to the production method of the present invention, it is possible to prevent the facilitated transport film from entering the porous film 12a (support 12) and to obtain a facilitated-transport type acidic gas separation film having excellent durability.

However, when the hydrophilic polymer layer 12c is formed on the base support 12A using the RtoR system, the surface of the base support 12A can be reliably hydrophilized with high production efficiency.

In the production method of the present invention, the hydrophilic polymer layer 12c is a layer formed of a polymer having hydrophilicity.

As the hydrophilic polymer (hydrophilic compound), a typical hydrophilic polymer can be widely and effectively used. Specific examples thereof include polysaccharides such as agarose, carrageenan, and carboxymethyl cellulose (CMC); and gelatin in addition to polyvinyl alcohol (PVA), polyacrylic acid, polyallylamine, polyethyleneimine, and polyethylene oxide. The hydrophilic polymer may have a compound structure (copolymer or the like) obtained by combing these. Further, a mixture of two or more kinds of these materials can be used for the hydrophilic polymer.

Particularly preferred examples thereof include polyvinyl alcohol, a polyvinyl alcohol-polyacrylic acid copolymer (PVA-PAA), and carboxymethyl cellulose.

Accordingly, the polymer coating solution used to form the hydrophilic polymer layer 12c is a typical coating material (coating composition) which is obtained by dissolving (dispersing) a monomer, a dimer, a trimer, an oligomer, or a prepolymer of a compound which becomes the hydrophilic polymer layer 12c, or a mixture of these; a curing agent, a curing accelerator, a crosslinking agent, a thickener, a reinforcing agent, or a filler in an organic solvent and which is used to form a resin layer (resin film).

Such a polymer coating solution may be prepared according to a known method.

The viscosity of the polymer coating solution used to form the hydrophilic polymer layer 12c may be appropriately set according to the conveying speed of the base support 12A and the type or characteristic of the coating device 32.

Here, a polymer coating solution having high, to some extent, viscosity (viscosity at the time of application) is preferable. Specifically, the viscosity of the polymer coating solution is preferably 100 cp or greater and more preferably 500 cp or greater.

From the viewpoints that the hydrophilic polymer layer 12c free from partial masses can be formed and the polymer coating solution can be uniformly applied without causing repelling, it is preferable that the viscosity of the polymer coating solution is in the above-described range.

Moreover, according to the production method of the present invention, the viscosity of the polymer coating solution may be obtained by measuring the viscosity at a rotation speed of 60 rpm with a B-type viscometer in conformity with JIS Z8803 under the condition in which the temperature of the polymer coating solution is used as the temperature at the time of application.

The viscosity of the polymer coating solution when applied to the porous film 12a can be controlled using a known method, for example, adjustment of the composition of the coating solution such as addition of polysaccharides or a thickener or adjustment of the amount of an organic solvent to be added; adjustment of the temperature of the polymer coating solution such as heating or cooling; mixture of hydrophilic polymers having viscosities different from each other; or adjustment of the molecular weight through partial crosslinking of a hydrophilic polymer.

The base support 12A is conveyed in the longitudinal direction while being supported by the backup roller 34 in a predetermined position, and the surface of the porous film 12a is coated with the polymer coating solution which becomes the hydrophilic polymer layer 12c using the coating device 32.

As described above, various known devices can be used as the coating device 32. In consideration of the preferred viscosity or coating amount of the polymer coating solution, specific preferred examples thereof include a roll coater, a bar coater, a positive rotation roll coater, and a knife coater.

In the composite to be formed by the production method of the present invention, it is preferable that 1% to 99% of the surface of the porous support (the porous film 12a in the example illustrated in the figure) is hydrophilized by forming the hydrophilic polymer layer 12c or performing hydrophilization using an ozone treatment described below. In other words, the ratio of the hydrophilized area in the surface of the porous support (porous film) is preferably in a range of 1% to 99%.

That is, it is preferable that the surface of the porous film 12a is coated with the polymer coating solution using the coating device 32 such that the hydrophilic polymer layer 12c that is formed by being cured covers the surface of the porous film 12a at a coverage of 1% to 99%. In other words, in the composite 10 formed by the production method of the present invention, it is preferable that the surface of the porous film 12a is covered by the hydrophilic polymer layer 12c at a coverage of 1% to 99%.

Moreover, the coverage (hydrophilicity of the surface) indicates the percentage of the total area of the hydrophilic polymer layer 12c covering the surface of the porous film 12a when the surface of the porous film 12a is seen. In other words, the coverage indicates the percentage of the area, in which fibers (materials forming the porous film) forming the porous film 12a is not seen, in the entire surface of the porous film 12a when the surface of the porous film 12a is seen. The area in which the fibers forming the porous film 12a is not seen indicates the area in which the fibers are hidden by the hydrophilic polymer layer 12c.

The coverage may be measured by capturing an image of the surface of the porous film 12a, for example, using an electron microscope or the like and image-analyzing the image using image analysis software.

When the coverage is less than 1%, the effects of forming the hydrophilic polymer layer 12c cannot be sufficiently obtained and most of the silicone resin layer 14 to be subsequently formed infiltrates into the porous film 12a.

Since permeation of gas is hindered by the hydrophilic polymer layer 12c when the coverage is greater than 99%, the gas permeability is degraded and the treatment efficiency resulting from the acidic gas separation film is reduced.

From this viewpoint, the coverage of the porous film 12a being covered by the hydrophilic polymer layer 12c is more preferably in a range of 5% to 98% and particularly preferably in a range of 10% to 95%.

Particularly, in the case where the surface of the porous film 12a is hydrophilized by forming the hydrophilic polymer layer 12c, the coverage of the porous film 12a being covered by the hydrophilic polymer layer 12c is preferably in a range of 20% to 90%.

The coverage of the hydrophilic polymer layer 12c may be controlled by performing an experiment or simulation in advance.

A thickness in which hydrophilicity required according to, for example, the material forming the hydrophilic polymer layer 12c can be obtained may be set as the film thickness of the hydrophilic polymer layer 12c.

According to the examination of the present inventors, the required hydrophilicity can be obtained when the thickness of the hydrophilic polymer layer 12c is set to 0.001 μm or greater.

In consideration of the gas permeability or the like, it is preferable that the hydrophilic polymer layer 12c is thin when required hydrophilicity can be secured. Specifically, the thickness of the hydrophilic polymer layer 12c is preferably 10 μm or less and more preferably 5 μm or less.

Therefore, it is preferable that the polymer coating solution is applied by the coating device 32 such that the thickness of the hydrophilic polymer layer 12c obtained through drying and curing is in the above-described range.

In addition, the thickness of the hydrophilic polymer layer 12c is the thickness of the hydrophilic polymer layer 12c formed on the surface of the porous film 12a.

The film thickness of the hydrophilic polymer layer 12c may be controlled by performing an experiment or simulation in advance.

The base support 12A coated with the polymer coating solution in the coating unit 26 is conveyed to the curing unit 28 that performs a drying process.

As described above, the curing unit 28 includes the drying device 28a and the curing device 28b. The polymer coating solution is dried by the drying device 28a while the base support 12A is conveyed in the longitudinal direction, and then the hydrophilic polymer is cured (monomer or the like is cross-linked) by the curing device 28b. In this manner, the base support 12A becomes the support 12 whose surface is formed with the hydrophilic polymer layer 12c and hydrophilized.

As described above, known devices in accordance with the polymer coating solution or the hydrophilic polymer layer 12c can be used as the drying device 28a and the curing device 28b.

Depending on the composition of the polymer coating solution or the type of the hydrophilic polymer layer 12c, the polymer coating solution may be dried and cured at the same time. Further, the hydrophilic polymer layer 12c may be formed only by drying the polymer coating solution. That is, when the hydrophilic polymer layer 12c is formed, the curing after the polymer coating solution is dried may be performed if necessary.

The polymer coating solution may be dried and/or cured in an inert atmosphere, for example, a nitrogen atmosphere, if necessary.

In the support 12 on which the hydrophilic polymer layer 12c is formed in the above-described manner, that is, the support 12 whose surface is hydrophilized, the contact angle between the support and water on the surface in air is preferably in a range of 0° C. to 90° C. and more preferably in a range of 0° to 75°.

From the viewpoint that penetration of the silicone coating solution can be suppressed, it is preferable that the contact angle between the hydrophilized support 12 and water on the surface in air is in the range of 0° to 90°. The contact angle (surface contact angle) of water with respect to the hydrophilic polymer layer 12c may be obtained, for example, by selecting arbitrary five drops among water droplets on the material to be measured, measuring the contact angles at room temperature (25° C.), and acquiring the average value of the measurement results.

The base support 12A, that is, the support 12 obtained by curing the polymer coating solution using the curing unit 28 and forming the hydrophilic polymer layer 12c is guided by the pass rollers 38a to 38e and conveyed to the winding shaft 40 of the winding unit 30 as described above.

The support 12 is wound around the winding shaft 40 to obtain the support roll 12R formed by winding the long support 12.

In the production method of the present invention, when the support 12 having the hydrophilic polymer layer 12c is formed in the above-described manner, the surface of the hydrophilic polymer layer 12c is coated with the silicone coating solution to form the silicone resin layer 14. In other words, in the production method of the present invention, when the surface of the support 12 is hydrophilized, the hydrophilized surface is coated with the silicone coating solution to form the silicone resin layer 14.

At the time of formation of the silicone resin layer 14, the support roll 12R that is prepared in advance is removed from the winding shaft 40 of the winding unit 30 and loaded to the rotary shaft 31 of the supply unit 24.

In the supply unit 24, the base support 12A is fed from the base support roll 12AR and conveyed to the coating unit 26 by rotating the rotary shaft 31.

The support 12 fed from the support roll 12R is subsequently conveyed to the coating unit 26, and the surface of the hydrophilic polymer layer 12c (porous film 12a) is coated with the silicone coating solution which becomes the silicone resin layer 14 by the coating unit 26 while being supported by the backup roller 34 in a predetermined position, and conveyed in the longitudinal direction.

Further, from the viewpoint of productivity, it is preferable that the conveying speed of the support 12 is high. However, in order to uniformly apply the silicone coating solution, the conveying speed thereof is preferably in a range of 3 m/min to 200 m/min, more preferably in a range of 5 m/min to 150 m/min, and particularly preferably in a range of 10 m/min to 120 m/min.

The silicone resin layer 14 is a layer formed of a compound having a so-called silicone bond or a silicone-containing compound.

As the silicone resin layer 14, silicone-containing polyacetylene such as organopolysiloxane (silicone resin) or polytrimethylsilylpropyne can be used. Specific examples of the organopolysiloxane include compounds represented by the following formula.

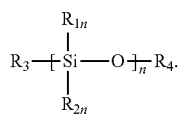

In the formula described above, n represents an integer of 1 or greater. Here, from the viewpoints of availability, volatility, and viscosity, the average value of n is preferably in a range of 10 to 1000000 and more preferably in a range of 100 to 100000.

Further, $R_{1n}$, $R_{2n}$, $R_3$, and $R_4$ each independently represent any group selected from the group consisting of a hydrogen atom, an alkyl group, a vinyl group, an aralkyl group, an aryl group, a hydroxyl group, an amino group, a carboxyl group, and an epoxy group. Moreover, when n $R_{1n}$'s and n $R_{2n}$'s are present, $R_{1n}$'s and $R_{2n}$'s may be the same as or different from each other respectively. Moreover, the alkyl group, the aralkyl group, and the aryl group may have a ring structure. Further, the alkyl group, the vinyl group, the aralkyl group, and the aryl group may have a substituent, and the substituent at this time can be selected from, for example, an alkyl group, a vinyl group, an aryl group, a hydroxyl group, an amino group, a carboxyl group, an epoxy group, and a fluorine atom. These substituents may further have a substituent, if possible.

From the viewpoint of availability, it is more preferable that the alkyl group, the vinyl group, the aralkyl group, and the aryl group selected as $R_{1n}$, $R_{2n}$, $R_3$, and $R_4$ is an alkyl group having 1 to 20 carbon atoms, a vinyl group having 1 to 20 carbon atoms, an aralkyl group having 7 to 20 carbon atoms, and an aryl group having 6 to 20 carbon atoms.

Particularly, it is preferable that $R_{1n}$, $R_{2n}$, $R_3$, and $R_4$ represent a methyl group or an epoxy-substituted alkyl group, and epoxy-modified polydimethylsiloxane (PDMS) or the like can be suitably used.

Accordingly, the silicone coating solution used to form the silicone resin layer 14 is a typical coating material (coating composition) which is obtained by dissolving or dispersing a monomer, a dimer, a trimer, an oligomer, or a prepolymer of a compound which becomes the silicone resin layer 14, or a mixture of these; a curing agent, a curing accelerator, a crosslinking agent, a thickener, a reinforcing agent, or a filler in an organic solvent and which is used to form a silicone resin layer (silicone resin film) according to the coating method.

Such a silicone coating solution may be prepared according to a known method.

In the production method of the present invention, the hydrophilic polymer layer 12c is formed on the surface of the support 12, that is, the surface thereof is hydrophilized.

For this reason, as described above, the surface of the support 12 can be suitably coated with the silicone coating solution having hydrophobicity (component which becomes the silicone resin layer 14) without the silicone coating solution infiltrating into the porous support 12.

In the production method of the present invention, the concentration of the silicone coating solution may be appropriately set according to the film thickness of the silicone resin layer 14 to be formed or the conveying speed of the support 12. Moreover, the concentration of the silicone coating solution indicates the concentration of the component which becomes the silicone resin layer 14.

The viscosity of the silicone coating solution may be appropriately set according to the conveying speed of the support 12 or the type or the performance of the coating device 32.

The support 12 is conveyed in the longitudinal direction while being supported by the backup roller 34 in a predetermined position and the surface thereof is coated with the silicone coating solution which becomes the silicone resin layer 14.

As described above, various known devices can be used as the coating device 32 in accordance with the silicone coating solution. Particularly, preferred examples thereof include a roll coater, a direct gravure coater, an offset gravure coater, a one-roll kiss coater, a three reverse roll coater, a positive rotation roll coater, a squeeze coater, and a reverse roll coater.

According to the production method of the present invention, coating devices 32 which are different from each other may be respectively used for application of the polymer coating solution and application of the silicone coating solution.

The surface of the hydrophilic polymer layer 12c is coated with the silicone coating solution using the coating device 32 such that the film thickness of the silicone resin layer 14 to be formed by being cured is 10 μm or less. In other words, in the production method of the present invention, the film thickness of the silicone resin layer 14 to be formed is preferably 10 μm or less.

In the present invention, the film thickness of the silicone resin layer 14 indicates the film thickness of the silicone resin layer 14 formed on the surface of the porous film 12a (on the porous film 12a) without the thickness of the silicone resin layer having infiltrated into the porous film 12a.

From the viewpoint that degradation of gas permeability due to the silicone resin layer 14 can be suitably prevented, it is preferable that the film thickness of the silicone resin layer 14 is adjusted to be 10 μm or less.

From this viewpoint, the film thickness of the silicone resin layer 14 is more preferably 5 μm or less.

The silicone resin layer 14 may be thin if a dense film entirely covers the surface of the porous film 12a without any space left.

From this viewpoint, the film thickness of the silicone resin layer 14 is preferably 0.01 μm or greater. When the film thickness of the silicone resin layer 14 is set to be 0.01 μm or greater, the composite 10 in which the surface of the porous film 12a is suitably covered with the dense silicone resin layer 14 and entering of the facilitated transport film into the porous film 12a can be more suitably prevented can be obtained.

In consideration of the infiltration of the silicone coating solution into the porous film 12a described below, the film thickness of the silicone resin layer 14 may be controlled by performing an experiment or simulation in advance.

The support 12 coated with the silicone coating solution in the coating unit 26 is subsequently conveyed to the curing unit 28.

The silicone coating solution is dried by the drying device 28a while the support 12 is conveyed in the longitudinal direction in the curing unit 28, and then the silicone coating solution is cured (monomer or the like is cross-linked) by the curing device 28b to obtain the composite 10 in which the silicone resin layer 14 is formed on the surface of the support 12 (hydrophilic polymer layer 12c).

As the drying device 28a and the curing device 28b, known devices can be used in accordance with the silicone coating solution or the silicone resin layer 14 as described above. Further, according to the production method of the present invention, different drying methods or curing methods may be performed using the polymer coating solution and the silicone coating solution.

Here, due to the reasons that curling or deformation of the support 12 can be prevented by the curing device 28b and deterioration of a resin constituting the support 12 can be prevented by the curing device 28b, it is preferable that the silicone coating solution is cured by performing irradiation with ultraviolet rays or heating for a short period of time and particularly most preferable that the silicone coating solution is cured by performing irradiation with ultraviolet rays. In other words, according to the production method of the present invention, it is preferable that the silicone resin layer 14 is formed by the silicone coating solution using a monomer or the like which can be cured by performing irradiation with ultraviolet rays.

Further, depending on the composition of the silicone coating solution (silicone resin layer 14), the silicone coating solution may be dried and cured at the same time.

The silicone coating solution may be dried and/or cured in an inert atmosphere, for example, a nitrogen atmosphere, if necessary.

The silicone coating solution is dried and cured by the curing unit 28, and the composite 10 on which the silicone resin layer 14 is formed is guided by the pass rollers 38a to 38e and conveyed to the winding shaft 40 of the winding unit 30 as described above.

The composite 10 is wound around the winding shaft 40 to obtain the composite roll 10R formed by winding the long composite 10.

According to the method of producing a composite of the present invention, the hydrophilic polymer layer 12c is formed on the surface of the base support 12A in the above-described manner, and the surface of the support 12 is hydrophilized. Next, the surface of the support 12 is coated with the silicone coating solution and then cured, and the silicone resin layer 14 is formed thereon. Preferably, the surface of the silicone resin layer 14 is further coated with a coating composition which becomes a facilitated transport film, and the facilitated transport film 16 is formed, thereby obtaining an acidic gas separation film 18 (composite of the present invention) illustrated in FIG. 1B.

Moreover, according to the production method of the present invention, after the silicone resin layer 14 is formed, the surface of the support 12 (surface of the auxiliary support film 12b on which the silicone resin layer 14 is not formed) may be coated with a coating composition which becomes a facilitated transport film to form a facilitated transport film in the same manner as described below, without forming the facilitated transport film 16 on the surface of the silicone resin layer 14.

Figure 3:
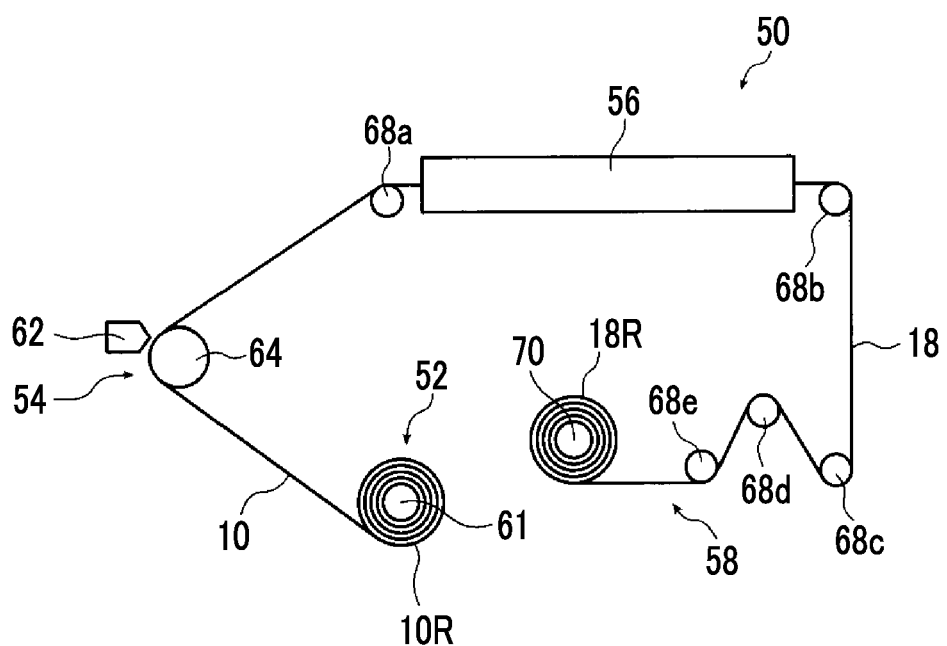
FIG. 3 is a view schematically illustrating an example of a production apparatus that performs another process of the method of producing a composite according to the present invention.

FIG. 3 schematically illustrates an example of a production apparatus that forms a facilitated transport film on the surface of the composite 10 according to the production method of the present invention. The surface of the composite 10 is the surface of the silicone resin layer 14 or the surface of the support 12.

A case where a facilitated transport film is formed on the surface of the silicone resin layer 14 is described below as an example.

The production method of the present invention is performed using the RtoR system even when the facilitated transport film 16 is formed on the surface of the silicone resin layer 14. Accordingly, a production apparatus 50 illustrated in FIG. 3 also feeds the composite 10 from the composite roll 10R formed by winding the long composite 10 and coats the silicone resin layer 14 with the coating composition which become the facilitated transport film 16 while conveying the composite 10 in the longitudinal direction. Next, the coating composition is dried and the facilitated transport film 16 is formed by the production apparatus 50 to obtain the acidic gas separation film 18 which is a kind of the composite produced according to the production method of the present invention. Moreover, the production apparatus 20 winds the prepared acidic gas separation film 18 in a roll shape to obtain a separation film roll 18R.

The production apparatus 50 basically includes a supply unit 52, a coating unit 54, a drying device 56, and a winding unit 58.

Similar to the production apparatus 20 described above, the production apparatus 50 may include various members provided for an apparatus that produces a functional film according to the RtoR system, for example, pass rollers or various sensors, if necessary, in addition to the members illustrated in the figures.

The supply unit 52 is a portion in which the composite 10 is fed by loading the composite roll 10R formed by winding the composite 10 in a roll shape to a rotary shaft 61 when the facilitated transport film 16 is formed on the composite 10 and rotating the rotary shaft 61, that is, the composite roll 10R.

Similar to the production apparatus 20 described above, the composite 10 may be fed and conveyed according to a known method.

The composite 10 fed from the composite roll 10R is conveyed in the longitudinal direction and conveyed to the coating unit 54, and then the surface thereof is coated with the coating composition which becomes the facilitated transport film 16.

In the example illustrated in the figure, the coating unit 54 includes a coating device 62 and a backup roller 64. The composite 10 is conveyed in the longitudinal direction while being supported by the backup roller 64 in a predetermined position and the surface of the silicone resin layer 14 is coated with the coating composition.

In the production method of the present invention, the conveying speed of the composite 10 when the facilitated transport film 16 is formed may be appropriately set according to the type of the composite 10 or the viscosity of the coating composition.

When the conveying speed of the composite 10 is excessively high, the uniformity in film thickness of the coating film of the coating composition may be degraded or the coating composition may be insufficiently dried. On the contrary, when the conveying speed thereof is excessively low, the productivity is degraded. From this viewpoint, the conveying speed of the composite 10 is preferably 0.5 m/min or greater, more preferably in a range of 0.75 m/min to 200 m/min, and particularly preferably in a range of 1 m/min to 200 m/min.

The facilitated transport film 16 contains a hydrophilic compound such as a hydrophilic polymer, a carrier reacting with acidic gas, and water.

Accordingly, the coating composition used to form the facilitated transport film 16 is a composition (a coating material or a coating solution) that contains a hydrophilic compound, a carrier, water (room temperature water or hot water), or a necessary component such as a crosslinking agent. The hydrophilic compound may be cross-linked, partially cross-linked, or uncrosslinked, and a mixture of these may be used.

The hydrophilic compound functions as a binder, holds moisture in the facilitated transport film 16, and exhibits a function of separating out gas such as carbon dioxide using a carrier. Moreover, it is preferable that the hydrophilic compound has a cross-linked structure from a viewpoint of heat resistance.

A hydrophilic compound having high hydrophilicity is preferable from viewpoints that the hydrophilic compound is dissolved in water and capable of forming a coating solution and it is preferable that the facilitated transport film 16 has high hydrophilicity (moisture-retaining properties).

Specifically, the hydrophilic compound has a hydrophilicity at which the amount of water able to be absorbed of physiological saline is preferably 0.5 g/g or greater, more preferably 1 g/g or greater, still more preferably 5 g/g or greater, particularly preferably 10 g/g or greater, and most preferably 20 or greater.

The weight average molecular weight of the hydrophilic compound may be appropriately selected within the range in which a stable film can be formed. Specifically, the weight average molecular weight thereof is preferably 20,000 to 2,000,000, more preferably 25,000 to 2,000,000, and particularly preferably 30,000 to 2,000,000.

By adjusting the weight average molecular weight of the hydrophilic compound to be 20,000 or greater, the facilitated transport film 16 which is stabilized and has sufficient film strength can be obtained.

Particularly, in a case where the hydrophilic compound includes a hydroxy group (—OH) as a crosslinkable group, the weight average molecular weight of the hydrophilic compound is preferably 30,000 or greater. At this time, the weight average molecular weight thereof is more preferably 40,000 or greater and still more preferably 50,000 or greater. Further, in the case where the hydrophilic compound includes —OH as a crosslinkable group, the weight average molecular weight thereof is preferably 6,000,000 or less from a viewpoint of production suitability.

In addition, in a case where the hydrophilic compound includes an amino group (—NH$_2$) as a crosslinkable group, the weight average molecular weight of the hydrophilic compound is preferably 10,000 or greater. At this time, the weight average molecular weight of the hydrophilic compound is more preferably 15,000 or greater and particularly preferably 20,000 or greater. Further, in the case where the hydrophilic compound includes —NH$_2$ as a crosslinkable group, the weight average molecular weight thereof is preferably 1,000,000 or less from a viewpoint of production suitability.

Further, a value measured in conformity with JIS K6726 may be used as the weight average molecular weight of the hydrophilic compound in a case where PVA is used as the hydrophilic compound. In addition, when a commercially available product is used, the molecular weight known by a catalog or a specification may be used.

As a crosslinkable group that forms a hydrophilic compound, one which can form a hydrolysis-resistant cross-linked structure is preferably selected.

Specific examples thereof include a hydroxy group, an amino group, a chlorine atom, a cyano group, a carboxy group, and an epoxy group. Among these, an amino group and a hydroxy group are preferable. Further, from viewpoints of affinity for a carrier and an effect of carrying a carrier, a hydroxy group is most preferable.

Specific examples of the hydrophilic compound which has a single crosslinkable group include polyallylamine, polyacrylic acid, polyvinyl alcohol, polyvinyl pyrrolidone, polyacrylamide, polyethyleneimine, polyvinylamine, poly-ornithine, polylysine, polyethylene oxide, water-soluble cellulose, starch, alginic acid, chitin, polysulfonic acid, polyhydroxy methacrylate, and poly-N-vinylacetamide. Polyvinyl alcohol is most preferable. In addition, as the hydrophilic compound, a copolymer of these may be exemplified.

Further, examples of the hydrophilic compound having a plurality of crosslinkable groups include a polyvinyl alcohol-polyacrylic acid copolymer. A polyvinyl alcohol-polyacrylic salt copolymer has high water absorption performance and high hydrogel strength at the time of high water absorption, which is preferable.

The content ratio of polyacrylic acid in the polyvinyl alcohol-polyacrylic acid copolymer is, for example, in a range of 1% by mole to 95% by mole, preferably in a range of 2% by mole to 70% by mole, more preferably in a range of 3% by mole to 60% by mole, and particularly preferably in a range of 5% by mole to 50% by mole. Further, the content ratio of the acrylic acid can be controlled using a known synthesis method.

In addition, in the polyvinyl alcohol-polyacrylic acid copolymer, there may be a salt of polyacrylic acid. As the polyacrylate at this time, an ammonium salt or an organic ammonium salt may be exemplified in addition to an alkali metal salt such as a sodium salt or a potassium salt.

A commercially available product can be used for the polyvinyl alcohol. Specific examples thereof include PVA117 (manufactured by KURARAY CO., LTD.), POVAL (manufactured by KURARAY CO., LTD.), polyvinyl alcohol (manufactured by Sigma-Aldrich Co., LLC.), and J-POVAL (manufactured by JAPAN VAM & POVAL CO., LTD.). The range of the molecular weight varies, but a product having a weight average molecular weight of 130,000 to 300,000 is preferable.

The polyvinyl alcohol-polyacrylate copolymer (sodium salt) may be a commercially available product. For example, KURASTOMER AP20 (manufactured by KURARAY CO., LTD.) is exemplified.

Moreover, in the production method of the present invention, hydrophilic compounds of the facilitated transport film 16 to be formed may be used in a mixture of two or more kinds thereof.

The content of the hydrophilic compound in the coating composition may be determined by appropriately setting the amount thereof in which the hydrophilic compound can function as a binder in the formed facilitated transport film 16 and moisture can be sufficiently held moisture according to the kind of hydrophilic composition or carrier.

Specifically, the content thereof in the facilitated transport film 16 is preferably in a range of 0.5% by mass to 50% by mass, more preferably in a range of 0.75% by mass to 30% by mass, and particularly preferably in a range of 1% by mass to 15% by mass. When the content of the hydrophilic compound is in the above-described range, the function as a binder and the function of holding moisture described above can be stably and suitably exhibited.

The cross-linked structure of the hydrophilic compound can be formed using a known method, for example, thermal crosslinking, ultraviolet crosslinking, electron beam crosslinking, radiation crosslinking, or photocrosslinking. Photocrosslinking or thermal crosslinking is preferable and thermal crosslinking is most preferable.

It is preferable that the coating composition contains a crosslinking agent.

As the crosslinking agent, a crosslinking agent including two or more functional groups which react with a hydrophilic compound and are capable of performing crosslinking such as thermal crosslinking or photocrosslinking is selected. Further, it is preferable that the cross-linked structure to be formed is a hydrolysis-resistant cross-linked structure.

From this viewpoint, preferred examples of the crosslinking agent to be added to the coating composition include an epoxy crosslinking agent, a polyvalent glycidyl ether, a polyhydric alcohol, a polyvalent isocyanate, a polyvalent aziridine, a haloepoxy compound, a polyvalent aldehyde, a polyvalent amine, and an organic metal-based crosslinking agent. A polyvalent aldehyde, an organic metal-based crosslinking agent, and an epoxy crosslinking agent are more preferable. Among these, a polyvalent aldehyde such as glutaraldehyde or formaldehyde having two or more aldehyde groups is preferable.

As the epoxy crosslinking agent, a compound including two or more epoxy groups may be exemplified and a compound including four or more epoxy groups is preferable. The epoxy crosslinking agent is also commercially available and examples thereof include trimethylolpropane triglycidyl ether (EPOLIGHT 100MF or the like, manufactured by KYOEISHA CHEMICAL Co., LTD.), EX-411, EX-313, EX-614B, EX-810, EX-811, EX-821, EX-830, (all manufactured by Nagase Chemtex Corporation), and EPIOL E400 (manufactured by NOF CORPORATION).

As a compound similar to an epoxy crosslinking agent, an oxetane compound having a cyclic ether is preferably used. A polyvalent glycidyl ether having two or more functional groups is preferable as an oxetane compound. A commercially available product can be used for an oxetane compound. Examples thereof include EX-411, EX313, EX-614B, EX-810, EX-811, EX-821, and EX-830 (all manufactured by Nagase Chemtex Corporation).

Examples of the polyvalent glycidyl ether include ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol glycidyl ether, and polypropylene glycol diglycidyl ether.

Examples of the polyhydric alcohol include ethylene glycol, diethylene glycol, triethylene glycol, tetraethylene glycol, polyethylene glycol, glycerin, polyglycerin, propylene glycol, diethanolamine, triethanolamine, polyoxypropyl, an oxyethylene-oxypropylene block copolymer, pentaerythritol, and sorbitol.

Examples of the polyvalent isocyanate include 2,4-toluylene diisocyanate and hexamethylene diisocyanate.

Examples of the polyvalent aziridine include 2,2-bishydroxymethylbutanol-tris[3-(1-aziridinyl)propionate], 1,6-hexamethylene diethylene urea, and diphenylmethane-bis-4,4'-N,N'-diethylene urea.

Examples of the haloepoxy compound include epichlorohydrin and α-methylchlorohydrin.

Examples of the polyvalent aldehyde include glutaraldehyde and glyoxal.

Examples of the polyvalent amine include ethylenediamine, diethylenetriamine, triethylenetetramine, tetraethylenepentamine, pentaethylenehexamine, and polyethyleneimine.

Further, examples of the organic metal-based crosslinking agent include an organic titanium crosslinking agent and an organic zirconia crosslinking agent.

For example, in a case where a polyvinyl alcohol having a weight average molecular weight of 130,000 or greater is used as a hydrophilic compound, an epoxy crosslinking agent or glutaraldehyde is preferably used in terms of excellent reactivity with the hydrophilic compound and capability of forming a cross-linked structure having excellent hydrolysis resistance.

In a case where a polyvinyl alcohol-polyacrylic acid copolymer is used as a hydrophilic compound, an epoxy crosslinking agent or glutaraldehyde is preferably used.

In a case where a polyallylamine having a weight average molecular weight of 10,000 or greater is used as a hydrophilic compound, an epoxy crosslinking agent, glutaraldehyde, or an organic metal crosslinking agent is preferably used in terms of excellent reactivity with the hydrophilic compound and capability of forming a cross-linked structure having excellent hydrolysis resistance.

In a case where a polyethyleneimine or polyallylamine is used as a hydrophilic compound, an epoxy crosslinking agent is preferably used.

The amount of a crosslinking agent may be appropriately set according to the type of hydrophilic compound or crosslinking agent used to be added to the coating composition.

Specifically, the amount thereof is preferably in a range of 0.001 parts by mass to 80 parts by mass, more preferably 0.01 parts by mass to 60 parts by mass, and particularly preferably 0.1 parts by mass to 50 parts by mass with respect to 100 parts by mass of a crosslinkable group included in the hydrophilic compound. When the content of the crosslinking agent is adjusted to be in the above-described range, the formation properties of the cross-linked structure become excellent and a facilitated transport film with excellent shape-maintaining properties can be obtained.

When the crosslinkable group included in the hydrophilic compound is considered, it is preferable that the cross-linked structure is formed by reacting 0.001 mol to 80 mol of a crosslinking agent with 100 mol of the crosslinkable group included in the hydrophilic compound.

In the facilitated transport film 16, the carrier (acidic gas carrier) reacts with acidic gas (for example, carbon dioxide ($CO_2$)) and transports the acidic gas.

The carrier may be a water-soluble compound which has affinity for acidic gas and shows basicity. Specific examples thereof include an alkali metal compound, a nitrogen-containing compound, and a sulfur compound.

A carrier may indirectly react with acidic gas or the carrier may directly react with acidic gas.

Examples of the former include carriers which react with another gas contained in a supply gas and show basicity and in which a basic compound thereof reacts with acidic gas. More specifically, the former is a compound which is capable of selectively taking $CO_2$ into the facilitated transport film 16 by reacting with steam (moisture) to release $OH^-$ and allowing $OH^-$ to react with $CO_2$ and examples thereof include an alkali metal compound.

Examples of the latter include a nitrogen-containing compound and a sulfur oxide in which a carrier has basicity.

Examples of the alkali metal compound include alkali metal carbonates, alkali metal bicarbonates, and an alkali metal hydroxides. An alkali metal element selected from cesium, rubidium, potassium, lithium, and sodium is preferably used as an alkali metal. In the present invention, the alkali metal compound includes salts and ions thereof in addition to an alkali metal.

Examples of the alkali metal carbonate include lithium carbonate, sodium carbonate, potassium carbonate, rubidium carbonate, and cesium carbonate.

Examples of the alkali metal bicarbonate include lithium hydrogencarbonate, sodium hydrogencarbonate, potassium hydrogencarbonate, rubidium hydrogencarbonate, and cesium hydrogencarbonate.

Examples of the alkali metal hydroxide include lithium hydroxide, sodium hydroxide, potassium hydroxide, rubidium hydroxide, and cesium hydroxide.

Among these, an alkali metal carbonate is preferable, and a compound containing potassium, rubidium, and cesium which have high solubility in water are preferable from a viewpoint of excellent affinity for acidic gas.

When an alkali metal compound is used as a carrier, two or more kinds of carriers may be used in combination.

When two or more kinds of carriers are present in the facilitated transport film 16, different kinds of carriers in the film can be separated from each other. In this manner, adhesion (blocking) of the facilitated transport films 16 to each other or adhesion of the facilitated transport film 16 to another member, caused by water-absorbing properties of the facilitated transport film 16, can be suitably suppressed at the time of production or the like due to a difference in deliquescency among a plurality of carriers.

In terms that the effect of suppressing blocking can be more suitably obtained, in a case where two or more kinds of alkali metal compounds are used as carriers, it is preferable that a first compound having deliquescency and a second compound having less deliquescency and a smaller specific gravity than those of the first compound are included. As an example, cesium carbonate is exemplified as the first compound and potassium carbonate is exemplified as the second compound.

As the nitrogen-containing compounds, amino acids such as glycine, alanine, serine, proline, histidine, taurine, and diaminopropionic acid; hetero compounds such as pyridine, histidine, piperazine, imidazole, and triazine; alkanolamines such as monoethanolamine, diethanolamine, triethanolamine, monopropanolamine, dipropanolamine, and tripropanolamine; cyclic polyether amines such as cryptand [2.1] and cryptand[2.2]; bicyclic polyether amines such as cryptand[2.2.1] and cryptand[2.2.2]; porphyrin; phthalocyanine; and ethylenediaminetetraacetic acid can be used.

As sulfur compounds, amino acids such as cystine and cysteine; polythiophene; and dodecylthiol can be used.

The content of carriers in the coating composition may be appropriately set according to the type of carrier and hydrophilic compound. Specifically, the amount of carriers in the facilitated transport film 16 is preferably in a range of 0.3% by mass to 30% by mass, more preferably in a range of 0.5% by mass to 25% by mass, and particularly preferably in a range of 1% by mass to 20% by mass.

When the content of the carriers in the coating composition is in the above-described range, salting-out before application can be suitably prevented. Further, the formed facilitated transport film 16 can reliably exhibit the function of separating out acidic gas.

The amount ratio of the hydrophilic compound to the carrier in the coating composition is preferably in a range of 1:9 to 2:3, more preferably in a range of 1:4 to 2:3, and particularly preferably in a range of 3:7 to 2:3 in terms of the mass ratio of the hydrophilic compound to the carrier.

The coating composition may contain a thickener as needed.

Preferred examples of the thickener include polysaccharide thickeners such as agar, carboxymethyl cellulose, carrageenan, xanthan gum, guar gum, and pectin. Among these, from the viewpoints of film-forming properties, availability, and the cost, carboxymethyl cellulose is preferable.

When carboxymethyl cellulose is used, a coating composition having a desired viscosity can be easily obtained with a small content thereof and at least a part of the components other than a solvent contained in the coating solution is less likely to be deposited without being dissolved in the coating solution.

It is preferable that the content of the thickener in the coating composition (coating solution) is as small as possible if the viscosity can be adjusted to a target viscosity.

As a general indicator, the content thereof is preferably 10% by mass or less, more preferably 0.1% by mass to 5% by mass, and still more preferably 0.1% by mass to 2% by mass.

The coating composition (facilitated transport film 16) may contain various components as needed in addition to such a hydrophilic compound, a crosslinking agent, a carrier, and a thickener.

Examples of such a component include an antioxidant such as dibutylhydroxytoluene (BHT); a specific compound such as a compound which includes an alkyl group having 3 to 20 carbon atoms or a fluorinated alkyl compound having 3 to 20 carbon atoms and a hydrophilic group, or a compound having a siloxane structure; a surfactant such as sodium octanate or sodium 1-hexasulfonate; and polymer particles such as polyolefin particles or polymethyl methacrylate particles.

In addition, if necessary, a catalyst, a moisturizing agent (moisture absorbent), a co-solvent, a film strength control agent, or a defect detection agent may be used.

The coating composition may be prepared using a known method. That is, first, a coating composition which becomes the facilitated transport film 16 can be prepared by adding respectively appropriate amounts of a hydrophilic compound, a carrier, and various components to be added if necessary to water (room temperature water or hot water) and sufficiently stirring the solution.

In the preparation of the coating composition, dissolution of each component may be promoted by stirring and heating the solution if necessary. In addition, after a hydrophilic compound is added to water and dissolved therein, deposition (salting-out) of the hydrophilic compound can be effectively prevented by gradually adding a carrier to the solution and stirring the same.

It is preferable that the viscosity of the coating composition which becomes the facilitated transport film 16 at 25° C. is 100 cp or greater.

From the viewpoints that repelling at the time of coating the silicone resin layer 14 with the coating composition can be suppressed and the coating uniformity of the coating composition can be improved, it is preferable that the viscosity of the coating composition at 25° C. is 100 cp or greater.

The viscosity of the coating composition may be measured in the same manner as that of the polymer coating solution described above.

As described above, the coating unit 54 is a portion that coats the composite 10 (silicone resin layer 14) conveyed in the longitudinal direction with such a coating composition.

In the example illustrated in the figure, the coating unit 54 is configured of the coating device 62 and the backup roller 64. That is, the composite 10 is conveyed while being held in a predetermined coating position by the backup roller 64 and is coated with the coating composition by the coating device 62 to form a coating film (liquid film) of the coating composition. In the coating unit 54, the temperature of the coating composition or the composite 10 may be controlled as needed.

Various known devices can be used as the coating device 62, and examples thereof are the same as those of the coating device 32 described above. In consideration of the preferred viscosity of the coating composition or the coating amount of the coating composition, preferred examples thereof include a roll coater, a bar coater, a positive rotation roll coater, and a knife coater.

Here, in the production method of the present invention, when the facilitated transport film 16 is formed, it is preferable that the support 12 is coated with the coating composition by the coating device 62 such that the thickness of the coating film (the thickness of the coating composition to be applied to the composite 10) is in a range of 0.05 mm to 2 mm.

From the viewpoints that the facilitated transport film 16 suitably expressing a target function can be formed, generation of a defect caused by mixing of bubbles or foreign matters can be prevented, and drying is sufficiently carried out using the drying device 56 described below, it is preferable that the thickness of the coating film of the coating composition is in the above-described range.

From this viewpoint, the thickness of the coating film which becomes the facilitated transport film 16 is more preferably in a range of 0.1 mm to 1.5 mm.

According to the production method of the present invention, the film thickness of the facilitated transport film 16 to be formed by drying the coating composition described below may be appropriately set according to the composition or the like of the facilitated transport film 16 to achieve the film thickness in which target performance is obtained. Specifically, the thickness of the facilitated transport film 16 is preferably in a range of 3 µm to 1000 µm and more preferably in a range of 5 µm to 500 µm. The film thickness of the facilitated transport film 16 may be controlled in the same manner as that of the silicone resin layer 14 described above.

In other words, it is preferable that the coating composition is prepared such that the facilitated transport film 16 having the same thickness as that of the coating film described above is obtained.

From the viewpoint of improving the gas permeability and suppressing generation of a defect, it is preferable that the film thickness of the facilitated transport film 16 is in the above-described range.

Moreover, according to the production method of the present invention, facilitated transport films with plural layers having compositions which are the same as or different from each other may be formed.

The composite 10 coated with the coating composition by the coating unit 54 is guided by a pass roller 68a that is brought into contact with the rear surface (surface on the opposite side of the surface coated with the coating composition) and conveyed to the drying device 56.

The drying device 56 (drying process) is a portion in which the acidic gas separation film 18 is prepared by removing at least some water from the coating composition applied to the support 12 and drying the water or further crosslinking the hydrophilic compound for formation of the facilitated transport film 16.

As the drying method, various known drying methods, for example, a hot-air drying method, a drying method in which drying is carried out by heating the support 12, and a drying method in which drying is carried out by removing water can be used.

In the case of hot-air drying, the air speed of the hot air may be determined by appropriately setting a speed thereof which can rapidly dry the coating composition and at which the coating film (gel film) of the coating composition does not collapse. Specifically, the air speed thereof is preferably in a range of 0.5 m/min to 200 m/min, more preferably in a range of 0.75 m/min to 200 m/min, and particularly preferably in a range of 1 m/min to 200 m/min.

The temperature of the hot air may be determined by appropriately setting a temperature at which deformation or the like of the support 12 does not occur and the coating composition can be rapidly dried. Specifically, the temperature of the film surface is preferably in a range of 1° C. to 120° C., more preferably 2° C. to 115° C., and particularly preferably 3° C. to 110° C.

In the case of drying which is carried out by heating the support 12, the temperature at which deformation or the like of the support 12 does not occur and the coating composition can be rapidly dried may be appropriately set. In addition, the heating of the support 12 and blowing of dry air may be used in combination.

Specifically, the drying is performed by setting the temperature of the support 12 to be preferably in a range of 60° C. to 120° C., more preferably in a range of in a range of 60° C. to 90° C., and particularly preferably in a range of 70° C. to 80° C. At this time, the film surface temperature is preferably in a range of 15° C. to 80° C. and more preferably in a range of 30° C. to 70° C.

The composite 10, that is, the acidic gas separation film 18 on which the facilitated transport film 16 is formed by drying the coating film of the coating composition using the drying device 56 is guided by a pass roller 68b and conveyed to the winding unit 58. This composite 10 is the composite of the present invention.

The winding unit 58 winds the acidic gas separation film 18 around a winding shaft 70 to obtain the separation film roll 18R.

The winding unit 58 includes the above-described winding shaft 70 and three pass rollers 68c to 68e.

The acidic gas separation film 18 is guided to a predetermined conveying path by the pass rollers 68c to 68e and wound around the winding shaft 70 (separation film roll 18R) to be formed as the separation film roll 18R.

Moreover, similarly, the acidic gas separation film 18 is guided to the predetermined conveying path by the pass rollers 68c to 68e and wound around the winding shaft 70 (separation film roll 18R) to be formed as the separation film roll 18R. The three pass rollers 68c to 68e are operated as a tension cutter and guide the composite such that the composite 10 or the like meanders.

Hereinafter, the method of producing a composite of the present invention will be described in more detail by describing an example of the operations of the production apparatus 20 and the production apparatus 50.

First, the base support roll 12AR is mounted on the rotary shaft 31 of the supply unit 24 of the production apparatus 20 and the base support 12A is fed from the base support roll 12AR by rotating the rotary shaft 31. Next, the base support 12A fed from the base support roll 12AR passes through (inserts into/feeds paper through) a predetermined conveying path leading to the winding shaft 40 after passing through the coating unit 26 (backup roller 34), the curing unit 28, and the pass rollers 38a to 38e, and the tip of the base support 12A is wound around the winding shaft 40.

The base support 12A has a two-layer structure consisting of the porous film 12a and the auxiliary support film 12b as illustrated in FIG. 1A. The base support roll 12AR is mounted on the rotary shaft 31 such that the porous film 12a side faces the coating device 32.

Further, the coating device 32 is filled with a required amount of the polymer coating solution.

When the base support 12A passes through the predetermined conveying path and the coating device 62 is filled with the coating composition, the rotary shaft 31, the winding shaft 40, the backup roller 34, and the like are synchronized with each other to be driven, and the conveyance of the base support 12A is started.

The base support 12A fed from the base support roll 12AR is conveyed in the longitudinal direction. At the same time, in the coating unit 54, the base support 12A is conveyed while being supported by the backup roller 64 in a predetermined coating position and is coated with the polymer coating solution, which becomes the hydrophilic polymer layer 12c, by the coating device 32 so as to have a target coating thickness (coating amount).

The support 12 coated with the polymer coating solution is conveyed to the curing unit 28.

In the curing unit 28, for example, the polymer coating solution is dried by the drying device 28a according to the hot-air drying, and then the hydrophilic polymer layer 12c is formed, thereby forming the support 12 by hydrophilizing the surface thereof. Moreover, as described above, at the time of formation of the hydrophilic polymer layer 12c, the polymer coating solution is dried and then cured by the curing device 28b as needed.

The support 12 on which the silicone resin layer 14 is formed is guided to a predetermined conveying path by the pass rollers 38a to 38d, conveyed to the winding unit 30, guided to the winding shaft 40 by the pass roller 38e, and wound round the winding shaft 40 to obtain the support roll 12R.

When the support roll 12R formed by winding the support 12 having a predetermined length is formed, the support 12 is cut and the rest of the support 12 is wound if necessary. Further, the base support 12A, the support 12, and the base support roll 12AR are removed from the production apparatus 20.

Thereafter, the support roll 12R is removed from the winding shaft 40 of the winding unit 30. Further, the support roll 12R is mounted on the rotary shaft 31 of the supply unit 24 and the support 12 is fed from the support roll 12R by rotating the rotary shaft 31.

Next, the support 12 fed from the support roll 12R passes through a predetermined conveying path leading to the winding shaft 40 from the supply unit 24, and the tip thereof is wound around the winding shaft 40 in the same manner as described above.

The support roll 12R is mounted on the rotary shaft 31 such that the hydrophilic polymer layer 12c side (hydrophilic treatment surface side) faces the coating device 32.

Moreover, the coating device 32 is filled with a required amount of the silicone coating solution.

When the support 12 passes through the predetermined conveying path and then the coating device 62 is filled with the coating composition, the rotary shaft 31, the winding shaft 40, the backup roller 34, and the like are synchronized with each other to be driven and the conveyance of the support 12 is started.

The support 12 fed from the support roll 12R is conveyed in the longitudinal direction in the same manner as described above. At the same time, in the coating unit 54, the support 12 is conveyed while being supported by the backup roller 64 in a predetermined coating position and is coated with the silicone coating solution, which becomes the silicone resin layer 14, by the coating device 32 so as to have a target coating thickness (coating amount).

In the present invention, the support 12 is formed with the hydrophilic polymer layer 12c on the surface thereof and the surface (surface coated with the silicone coating solution) is hydrophilized. For this reason, it is possible to suitably prevent infiltration of the silicone coating solution into the porous film 12a which is a porous material and to form a coating film of an appropriate silicone coating solution.

The support 12 coated with the silicone coating solution which becomes the silicone resin layer 14 is conveyed to the curing unit 28. In addition, for example, the silicone coating solution is dried by the drying device 28a according to the hot-air drying and cured by performing irradiation with ultraviolet rays using the curing device 28b to form the silicone resin layer 14, thereby forming the composite 10.

In the same manner as described above, the composite 10 on which the silicone resin layer 14 is formed is guided to the winding shaft 40 by the pass rollers 38a to 38e and wound around the winding shaft (10 to obtain the composite roll 10R.

When the composite roll 10R formed by winding the composite 10 having a target length is completed, the composite 10 is cut and the composite roll 10R is removed from the winding shaft 40, if necessary, and then the composite roll 10R is mounted on the rotary shaft 61 of the supply unit 52 of the production apparatus 50.

Subsequently, the composite 10 is fed from the composite roll 10R by rotating the rotary shaft 61. Next, the composite 10 fed from the composite roll 10R passes through a predetermined conveying path leading to the winding shaft 70 after passing through the coating unit 54 (backup roller 64), the pass roller 68a, the drying device 56, and the pass rollers 68b and 68c to 68e, and the tip of the composite 10 is wound around the winding shaft 70.

Further, the coating device 62 is filled with a required amount of the coating composition.

When the composite 10 passes through the predetermined conveying path and the coating device 62 is filled with the coating composition, the rotary shaft 61, the winding shaft 70, the backup roller 64, and the like are synchronized with each other to be driven, and the conveyance of the composite 10 is started.

The composite 10 fed from the composite roll 10R is conveyed in the longitudinal direction. At the same time, in the coating unit 54, the composite 10 is conveyed in the longitudinal direction while being supported by the backup roller 64 in a predetermined coating position and is coated with the coating composition, which becomes the facilitated transport film 16, by the coating device 62 so as to have a predetermined coating thickness (coating amount).

The composite 10 coated with the coating composition which becomes the facilitated transport film 16 subsequently reaches the drying device 56 by being guided by the pass roller 68a and the coating composition is dried by the drying device 56, thereby obtaining the acidic gas separation film 18 on which the facilitated transport film 16 is formed and which is a kind of a composite produced by the production method of the present invention.

The acidic gas separation film 18 is guided by the pass roller 68b, conveyed to the winding unit 58, guided to a predetermined conveying path by the pass rollers 68c to 68e, and wound around the winding shaft 70 to obtain the separation film roll 18R.

The production apparatus 20 in the example of the figure includes only the coating device 32 and the curing unit 28. Further, the production apparatus 50 includes only the coating device 62 and the drying device 56. That is, in a case where these apparatuses are used, the hydrophilic polymer layer 12c, the silicone resin layer 14, and the facilitated transport film 16 are formed using separate apparatuses.

Figure 4:
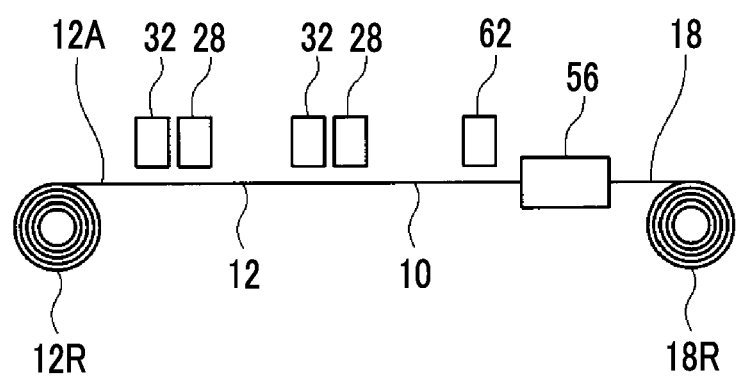
FIG. 4 is a view schematically illustrating another example of a production apparatus that performs the method of producing a composite according to the present invention.

However, according to the production method of the present invention, as conceptually illustrated in FIG. 4, the acidic gas separation film 18 (composite of the present invention) may be prepared by performing the feeding from the roll and the winding once according to the RtoR system using two combinations of the coating device 32 and the curing unit 28, and a device including the coating device 62 and the drying device 56 and forming the hydrophilic polymer layer 12c, the silicone resin layer 14, and the facilitated transport film 16.

Alternatively, only the hydrophilic polymer layer 12c is formed to form the support 12 whose surface is hydrophilized by performing the initial feeding from the roll and winding according to the RtoR system using one combination of the coating device 32 and the curing unit 28, and a device including the coating device 62 and the drying device 56. Next, the acidic gas separation film 18 (composite of the present invention) may be prepared by performing the initial feeding from the roll and winding for the second time according to the RtoR system and forming the silicone resin layer 14 and the facilitated transport film 16.

In the example described above, as a preferred embodiment, the support 12 whose surface is hydrophilized is obtained by forming the hydrophilic polymer layer 12c on the surface of the base support 12A, but the method of hydrophilizing the surface of the porous support is not limited thereto.

For example, in the apparatus illustrated in FIG. 2, the porous support whose surface is hydrophilized may be obtained by providing an ozone treatment device, a plasma treatment device, a corona discharge treatment device, and the like in place of the coating unit 26 and the curing unit 28 and applying an ozone treatment or the like to the surface of the base support 12A.

Further, in the example described above, only one surface of the base support 12A is hydrophilized. However, according to the production method of the present invention, both surfaces of the base support 12A may be hydrophilized as needed.

Hereinbefore, the method of producing a composite and the composite of the present invention have been described in detail, but the present invention is not limited to the examples described above. Further, various improvements or modifications are possible within the range not departing from the scope of the present invention.

EXAMPLES

Hereinafter, the present invention will be described in more detail with reference to specific examples of the present invention.

Example 1

Preparation of Polymer Coating Solution

As the polymer coating solution used to form the hydrophilic polymer layer 12c, an aqueous solution including 0.1% by mass of a polyvinyl alcohol-polyacrylic acid copolymer (KURASTOMER AP-20, manufactured by KURARAY CO., LTD.) and 0.5% by mass of carboxymethyl cellulose (CMC2280, manufactured by Daicel FineChem Ltd.) was prepared.

<Base Support>

The base support roll 12AR formed by winding a long porous base support 12A having a width of 500 mm and a thickness of 200 in a roll shape, was prepared. A laminate (manufactured by General Electric Company) formed by laminating porous PTFE, serving as the porous film 12a, on the surface of PP non-woven fabric, serving as the auxiliary support film 12b, was used as the base support 12A.

<Preparation of Support 12>

The base support roll 12AR was loaded to the rotary shaft 31 of the supply unit 24 of the production apparatus 20 illustrated in FIG. 2 such that the porous film 12a side was coated with the polymer coating solution. Next, the base support 12A was fed from the base support roll 12AR, and passed through a predetermined conveying path leading to the winding unit 30 after passing through the coating unit 26 and the curing unit 28 as described above, and the tip of the support 12 was wound around the winding shaft 40.

Further, the coating device 32 of the coating unit 26 was filled with the polymer coating solution.

After the above-described preparation was completed, the conveyance of the base support 12A was started as described above, the surface of the porous film 12a was coated with the polymer coating solution in the coating unit 26, and the polymer coating solution was dried by the drying device 28a in the curing unit 28 according to the hot-air drying to obtain the support 12 which was formed with the hydrophilic polymer layer 12c on the surface of the base support 12A and whose surface was hydrophilized. Further, the support roll 12R was obtained by winding the prepared support 12 around the winding shaft 40.

After the support roll 12R formed by winding the support 12 with a predetermined length was formed, the support roll 12R was removed from the winding shaft 40, and the base support 12A and the support 12 in the production apparatus 20 were removed therefrom.

The conveying speed of the base support 12A was set to 4 m/min.

The polymer coating solution was applied such that the film thickness of the hydrophilic polymer layer 12c was 1 μm. The relationship between the coating amount of the polymer coating solution and the film thickness of the hydrophilic polymer layer 12c was examined by performing an experiment in advance.

The surface of the formed hydrophilic polymer layer 12c was observed by a scanning electron microscope (SEM) and the coverage (the percentage of the total area of the hydrophilic polymer layer 12c covering the surface of the porous film 12a) in an arbitrary area having a dimension of 40 μm×40 μm was measured. As a result, the coverage was 85%.

Moreover, the contact angle with water with respect to the hydrophilic polymer layer 12c was measured by a contact angle measuring device (DM500, manufactured by Kyowa Interface Science Co., Ltd.). As a result, the contact angle thereof was 30°. The contact angle with water with respect to the hydrophilic polymer layer 12c was obtained by performing measurement on arbitrary five drops selected from water droplets adhered to the hydrophilic polymer layer 12c at room temperature (25° C.) and acquiring the average value thereof.

<Preparation of Silicone Coating Solution>

As the silicone coating solution used to form the silicone resin layer 14, a heptane solution containing 25% by mass of polymerizable polydimethylsiloxane (UV9300, manufactured by Momentive Performance Materials Inc.) and 0.125% by mass of 4-isopropyl-4'-methyldiphenyliodoniumtetrakis(pentafluorophenyl)borate (manufactured by Tokyo Chemical Industry Co., Ltd.) was prepared.

<Preparation of Composite 10>

The support roll 12R was loaded to the rotary shaft 31 of the supply unit 24 of the production apparatus 20 illustrated in FIG. 2 such that the hydrophilic polymer layer 12c was coated with the silicone coating solution. Next, the support 12 was fed from the support roll 12R, and passed through a predetermined conveying path leading to the winding unit 30 after passing through the coating unit 26 and the curing unit 28 as described above, and the tip of the support 12 was wound around the winding shaft 40.

Further, the coating device 32 of the coating unit 26 was filled with the silicone coating solution.

After the above-described preparation was completed, the conveyance of the support 12 was started as described above, the surface of the hydrophilic polymer layer 12c was coated with the silicone coating solution in the coating unit 26, the silicone coating solution was dried in the curing unit 28 according to the hot-air drying, and the silicone coating solution was cured by performing irradiation with ultraviolet rays to form the composite 10 obtained by forming the silicone resin layer 14 on the support 12. Further, the support roll 10R was obtained by winding the prepared composite 10 around the winding shaft 70.

The conveying speed of the support 12 was set to 35 m/min.

The silicone coating solution was applied such that the thickness of the silicone resin layer 14 was 10 μm. The film thickness of the silicone resin layer 14 and the coating amount of the silicone coating solution were examined by performing an experiment in advance.

Example 2

As the polymer coating solution used to form the hydrophilic polymer layer 12c, an aqueous solution including 0.75% by mass of polyvinyl alcohol (PVA117, manufactured by KURARAY CO., LTD.) and 0.38% by mass of carboxymethyl cellulose (CMC2280, manufactured by Daicel FineChem Ltd.) was prepared.

The composite 10 was prepared in the same manner as in Example 1 except that the hydrophilic polymer layer 12c was formed using this polymer coating solution, thereby obtaining the composite roll 10R.

The coverage of the hydrophilic polymer layer 12c and the contact angle with water with respect to the hydrophilic polymer layer 12c were measured in the same manner as in Example 1. As a result, the coverage thereof was 60% and the contact angle thereof was 40°.

Example 3

As the polymer coating solution used to form the hydrophilic polymer layer 12c, an aqueous solution including 0.1% by mass of polyvinyl alcohol (PVA117, manufactured by KURARAY CO., LTD.) and 0.5% by mass of carboxymethyl cellulose (CMC2280, manufactured by Daicel FineChem Ltd.) was prepared.

The composite 10 was prepared in the same manner as in Example 1 except that the hydrophilic polymer layer 12c was formed using this polymer coating solution, thereby obtaining the composite roll 10R.

The coverage of the hydrophilic polymer layer 12c and the contact angle with water with respect to the hydrophilic polymer layer 12c were measured in the same manner as in Example 1. As a result, the coverage thereof was 80% and the contact angle thereof was 40°.

Example 4

As the polymer coating solution used to form the hydrophilic polymer layer 12c, an aqueous solution including 0.25% by mass of polyvinyl alcohol (PVA117, manufactured by KURARAY CO., LTD.) and 0.13% by mass of carboxymethyl cellulose (CMC2280, manufactured by Daicel FineChem Ltd.) was prepared.

The composite 10 was prepared in the same manner as in Example 1 except that the hydrophilic polymer layer 12c was formed using this polymer coating solution, thereby obtaining the composite roll 10R.

The coverage of the hydrophilic polymer layer 12c and the contact angle with water with respect to the hydrophilic polymer layer 12c were measured in the same manner as in Example 1. As a result, the coverage thereof was 20% and the contact angle thereof was 40°.

Example 5

As the polymer coating solution used to form the hydrophilic polymer layer 12c, an aqueous solution including 10% by mass of polyvinyl alcohol (PVA117, manufactured by KURARAY CO., LTD.) was prepared.

The composite 10 was prepared in the same manner as in Example 1 except that the hydrophilic polymer layer 12c was formed using this polymer coating solution, thereby obtaining the composite roll 10R.

The coverage of the hydrophilic polymer layer 12c and the contact angle with water with respect to the hydrophilic polymer layer 12c were measured in the same manner as in Example 1. As a result, the coverage thereof was 90% and the contact angle thereof was 55°.

Comparative Example 1

The composite 10 was prepared in the same manner as in Example 1 except that the base support 12A was used, as it was, as the support 12 without forming the hydrophilic polymer layer 12c, thereby obtaining the composite roll 10R.

The contact angle with water with respect to the hydrophilic polymer layer 12c was measured in the same manner as in Example 1. As a result, the contact angle thereof was 120°.

[Gas Permeability Test]

The composite 10 was drawn out from each composite roll 10R and cut at an arbitrary position, thereby preparing a circular composite 10 having a diameter of 47 mm. Four sites of the circular composite 10 at intervals of 100 mm with respect to 500 mm in the width direction were sampled, and then permeation test samples were obtained.

Mixed gas of $CO_2$ and $H_2$ having a volume ratio of 25:75 was used as test gas. This mixed gas was supplied to each of the prepared permeation test samples under the conditions of a flow rate of 500 ml/min, a temperature of 40° C., and a total pressure of 500 kPa. Further, Ar gas (flow rate of 100 ml/min) was allowed to flow into the permeation side.

The permeating gas was analyzed by gas chromatography, the $CO_2$ permeation rate ($Q(CO_2)$) was calculated, and each composite was evaluated.

Further, the permeation rate unit (GPU) is "$1\times10^{-6}$ cm$^3$ (STP)/(sec·cm$^2$·cmHg)."

The evaluation criteria are as follows.

A: A case where pressurization at 500 kPa can be applied and the $CO_2$ permeation rate is 200 or greater under the above-described test conditions.

B: A case where pressurization at 500 kPa cannot be applied and the $CO_2$ permeation rate is less than 200 under the above-described test conditions.

The results are listed in the following table.

TABLE 1

|  | Porous support | Hydrophilic polymer layer ||| Coverage | Silicone resin layer | Evaluation |
|  |  | Hydrophilic compound 1 | Hydrophilic compound 2 | Contact angle |  |  |  |
| --- | --- | --- | --- | --- | --- | --- | --- |
| Example 1 | PTFE | PVA-PAA | CMC | 30° | 85% | PDMS | A |
| Example 2 | PTFE | PVA | CMC | 40° | 60% | PDMS | A |
| Example 3 | PTFE | PVA | CMC | 40° | 80% | PDMS | A |
| Example 4 | PTFE | PVA | CMC | 40° | 20% | PDMS | A |
| Example 5 | PTFE | PVA | — | 55° | 90% | PDMS | A |
| Comparative Example 1 | PTFE | — | — | 120° | 0% | PDMS | B |

As listed in the above-described table, in Examples 1 to 5 in which the support 12 whose surface was hydrophilized by forming the hydrophilic polymer layer 12c on the surface of the porous film 12a was used, the silicone coating solution can be applied without infiltrating into the support 12 due to the action of hydrophilization. Accordingly, in Examples 1 to 5, the composite 10, in which the silicone resin layer 14 can be suitably formed on the surface of the support 12 and pressurization at 500 kPa can be applied thereto and which had a $CO_2$ permeation rate of 200 or greater, had excellent performance as a composite that formed a facilitated-transport type acidic gas separation film.

Meanwhile, in Comparative Example 1 in which the base support 12A was used, as it was, as a support, a large amount of silicone coating solution infiltrated into the porous film 12a and thus the silicone resin layer 14 cannot be suitably formed and the pressurization at 500 kPa cannot be applied.

As shown from the results described above, the effects of the present invention are evident.

EXPLANATION OF REFERENCES

10: composite
10R: composite roll
12: (porous) support
12A: base support
12AR: base support roll
12R: support roll
12a: porous film
12b: auxiliary support film
12c: hydrophilic polymer layer
14: silicone resin layer
16: facilitated transport film
18: acidic gas separation film
18R: separation film roll
20, 50: production apparatus
26, 52: supply unit
26, 54: coating unit
28: curing unit
28a: drying device
28b: curing device
30, 58: winding unit
31, 61: rotary shaft
32, 62: coating device

34, 64: backup roller
38*a* to 38*e*, 68*a* to 68*e*: pass roller
40, 70: winding shaft
56: drying device

What is claimed is:

1. A composite comprising:
    a porous support of which at least one surface is hydrophilized by having a hydrophilic polymer layer on the at least one surface;
    a silicone resin layer which is formed on one surface that is the hydrophilic surface of the porous support; and
    a facilitated transport film formed on the silicone resin layer and contains a carrier at least reacting with acidic gas and a hydrophilic compound for carrying the carrier,
    wherein the porous support is covered by the hydrophilic polymer layer at a coverage in a range of 20% to 90%.

2. The composite according to claim 1, wherein the porous support has a maximum pore size of 5 μm or less and an average pore size in a range of 0.001 μm to 1 μm.

3. The composite according to claim 1, wherein the porous support has a porous film and an auxiliary support film, and the hydrophilic polymer layer is provided on a surface of the porous film, and
    wherein a film thickness of the porous film is in a range of 5 μm to 100 μm and a film thickness of the auxiliary support film is in a range of 50 μm to 300 μm.

* * * * *